(12) United States Patent
Takahashi

(10) Patent No.: US 7,306,154 B2
(45) Date of Patent: Dec. 11, 2007

(54) BARCODE SCANNING SYSTEM WITH A COMPENSATION CIRCUIT

(75) Inventor: Kentaro Takahashi, Saitama Pref. (JP)

(73) Assignee: Optoelectronics Co., Ltd., Warabi, Saitama Pref. (JP)

( * ) Notice: Subject to any disclaimer, the term of this patent is extended or adjusted under 35 U.S.C. 154(b) by 0 days.

(21) Appl. No.: 10/970,681

(22) Filed: Oct. 21, 2004

(65) Prior Publication Data

US 2006/0086801 A1    Apr. 27, 2006

(51) Int. Cl.
G06K 7/10 (2006.01)
G06K 9/24 (2006.01)
G06K 19/06 (2006.01)
H04N 3/02 (2006.01)
G02B 26/00 (2006.01)
G02B 5/08 (2006.01)

(52) U.S. Cl. ............... 235/462.36; 235/462.26; 235/462.33; 235/462.02

(58) Field of Classification Search ........... 235/462.25, 235/462.39, 462.36, 454, 462.46, 462.34, 235/462.38, 461, 462.01, 462.02, 462.33, 235/462.26
See application file for complete search history.

(56) References Cited

U.S. PATENT DOCUMENTS

| | | | |
|---|---|---|---|
| 4,800,256 A | | 1/1989 | Broockman et al. |
| 5,023,951 A | * | 6/1991 | Kahn ......................... 398/202 |
| 5,140,146 A | * | 8/1992 | Metlitsky et al. ...... 235/462.26 |
| 5,272,323 A | * | 12/1993 | Martino ................. 235/462.27 |
| 5,311,002 A | * | 5/1994 | Kamezawa et al. .... 235/462.27 |
| 5,371,361 A | * | 12/1994 | Arends et al. ......... 235/462.39 |
| 5,550,362 A | * | 8/1996 | Sherman ..................... 235/455 |
| 5,923,023 A | * | 7/1999 | Arends et al. ......... 235/462.25 |
| 6,354,505 B1 | * | 3/2002 | Lucera et al. .......... 235/472.01 |
| 6,527,180 B1 | | 3/2003 | Devorkis et al. |
| 6,547,145 B2 | * | 4/2003 | Colley et al. .......... 235/462.36 |
| 6,712,271 B2 | * | 3/2004 | Bianchi ................. 235/462.25 |
| 6,811,087 B2 | * | 11/2004 | Nakamura et al. ..... 235/462.26 |
| 2002/0162890 A1 | | 11/2002 | Tsi et al. |
| 2002/0263890 | | 11/2002 | Tsi et al. |
| 2005/0109849 A1 | * | 5/2005 | Good ..................... 235/462.39 |

FOREIGN PATENT DOCUMENTS

| | | |
|---|---|---|
| CA | 2043964 AA | 12/1991 |
| CN | 1267034 A | 9/2000 |

(Continued)

OTHER PUBLICATIONS

Int'l Search Report & Written Opin. Feb. 7, 2006.

(Continued)

Primary Examiner—Michael G. Lee
Assistant Examiner—Thien T Mai
(74) Attorney, Agent, or Firm—Kaplan Gilman Gibson & Dernier LLP

(57) ABSTRACT

A barcode scanning system is provided, which comprises an amplitude compensation circuit to change the amplitude of signals corresponding to each location on the barcode such that all the signals have the same amplitude. The changing of the amplitude may be determined according to an angular position or an oscillating velocity of an mirror. Preferably, the cutoff frequency of a low pass circuit in the barcode scanning system is variable according to the oscillating velocity or the angular position of the mirror too.

16 Claims, 6 Drawing Sheets

FOREIGN PATENT DOCUMENTS

| | | |
|---|---|---|
| DE | 69330769 T2 | 12/1993 |
| EP | 0460669 A2 | 12/1991 |
| EP | 0 433 593 B1 | 12/1993 |
| FR | 2823584 A | 10/2002 |
| GB | 2409558 A1 | 6/2005 |
| JP | 64-41079 | 2/1989 |
| JP | 04-181384 A2 | 6/1992 |
| JP | 7-177099 A | 7/1995 |
| JP | 2000-151290 A | 5/2000 |
| JP | 2000-353940 A | 12/2000 |
| JP | 2001-144552 A | 5/2001 |
| JP | 2001-196877 A | 7/2001 |
| JP | 2002-163601 A | 6/2002 |

OTHER PUBLICATIONS

Int'l Search Report & Written Opin. Jan. 24, 2006.
ISR and Written Opinion Aug. 2, 2006.
International Preliminary Report on Patentability of PCT/JP2005/019250 filed Oct. 13, 2005.

* cited by examiner

BARCODE SCANNING SYSTEM WITH A COMPENSATION CIRCUIT

BACKGROUND OF THE INVENTION

The present invention relates to barcode reading techniques, and more particularly, to a barcode scanning system having a compensation circuit for preprocessing a derivative signal response so as to prevent a decrease in sensitivity that could otherwise result from the differences in signal amplitude and frequency.

As illustrated in FIGS. 1 and 2, while reading a barcode 20 by a scanner 10, a mirror 11 in the scanner projects a light beam 15 onto the barcode 20 so as to obtain reflected light from the barcode 20 for generating a signal response by a photodetector (e.g., a photodiode 12). When the mirror 11 oscillates to implement the scanning function, the light beam 15 moves across the barcode 20 to collect the information encoded in the bars and spaces of the barcode 20. The photodiode 12 generates a photocurrent as the signal response to the light reflected from the barcode 20. A low pass filter (LPF) 30 rejects high frequency noises in the photocurrent signal before sending the signal to a preamplifier circuit 40 for amplification.

The amplitude of the reflected light signal received at the photo detector is largely affected by the light-receiving angle at which the photo detector views the reflected light from the symbol being read. The reflected light at the edge of a barcode is thus received less efficiently by the photo detector than light reflected from the center of a barcode. As a result, the signal amplitude and quality is higher for signals received from the area toward the center of the barcode.

Moreover, the cutoff frequency of the low pass filter 30 is conventionally designed as a fixed value and is determined by the frequency of the signal corresponding to the center point A of the barcode 20. However, during the oscillation of the mirror 11, the moving velocity V of the mirror 11 does not remain the same. More specifically, as shown in FIG. 4, the velocity V is at its highest when the mirror 11 arrives at the center of the oscillation (which corresponds to the center point A of the barcode 20), but gradually decreases toward a minimum when it moves to the sides of the angle of $\alpha_{max}$. Consequently, the signal response corresponding to the point A has the highest frequency, while the signals corresponding to the points C and D have the lowest frequency. Therefore, the cutoff frequency of the low pass filter 30 is not optimum as to the signals obtained when the mirror 11 is located closer to the sides (i.e., when light beam 15 projects onto the barcode 20 at locations closer to edges A or D). This also decreases the sensitivity in reading the barcode 20.

Therefore, there is a need for a solution to prevent the sensitivity in reading the barcode from decreasing because of the differences in the signal amplitude and/or frequency.

SUMMARY OF THE INVENTION

In a first aspect of the present invention, there is provided a barcode scanning system comprising a mirror oscillating angularly for projecting a light beam across a barcode to obtain a reflected light from the barcode, a photodetector for generating, from the reflected light, a signal having an amplitude corresponding to each angular position of the mirror, and a circuit for processing the signal such that the signal has the same amplitude for all the angular positions of the mirror.

In a second aspect of the present invention, there is provided a method for processing the signal obtained by projecting a light beam onto a barcode from an oscillating mirror, which comprises adjusting a gain to compensate for changes in signal amplitude so that the amplified signal has substantially the same amplitude at all positions of the mirror.

In a third aspect of the present invention, a barcode scanning system is provided which comprises a mirror oscillating angularly for projecting a light beam across a barcode to obtain a reflected light from the barcode, a photodetector for generating, from the reflected light, a signal having a frequency corresponding to each oscillating velocity of the mirror, and a low pass filter for rejecting high frequency noises, wherein the filter has a cutoff frequency that is variable in response to the oscillations of the mirror to perform scanning. Hence, at lower velocities, when the frequency of the desired signal is relatively low, any relatively high frequency components likely constitute undesirable noise, and will be eliminated. However, at higher velocities, the same relatively high frequency components may constitute desirable signal, rather than noise, and hence, the cutoff frequency will by increased so as not to incorrectly eliminate desirable signal.

In a fourth aspect of the present invention, the present invention provides a method for processing a stored or real time signal obtained by projecting a light beam onto a barcode from an oscillating mirror, which comprises a step of changing a cutoff frequency of a low pass filter in accordance with an oscillating velocity of the mirror.

With above aspects of the present invention, the cutoff frequency of the low pass filter is changed following the frequency of the signal, thus is always optimum for the signal being obtained or stored.

DESCRIPTION OF THE DRAWINGS

The above and other features and advantages of the present invention will be clearer by reading the following detailed description of preferred embodiments of the present invention with reference to the accompanying drawings, in which.

DETAILED DESCRIPTION OF THE INVENTION

Figure 1:
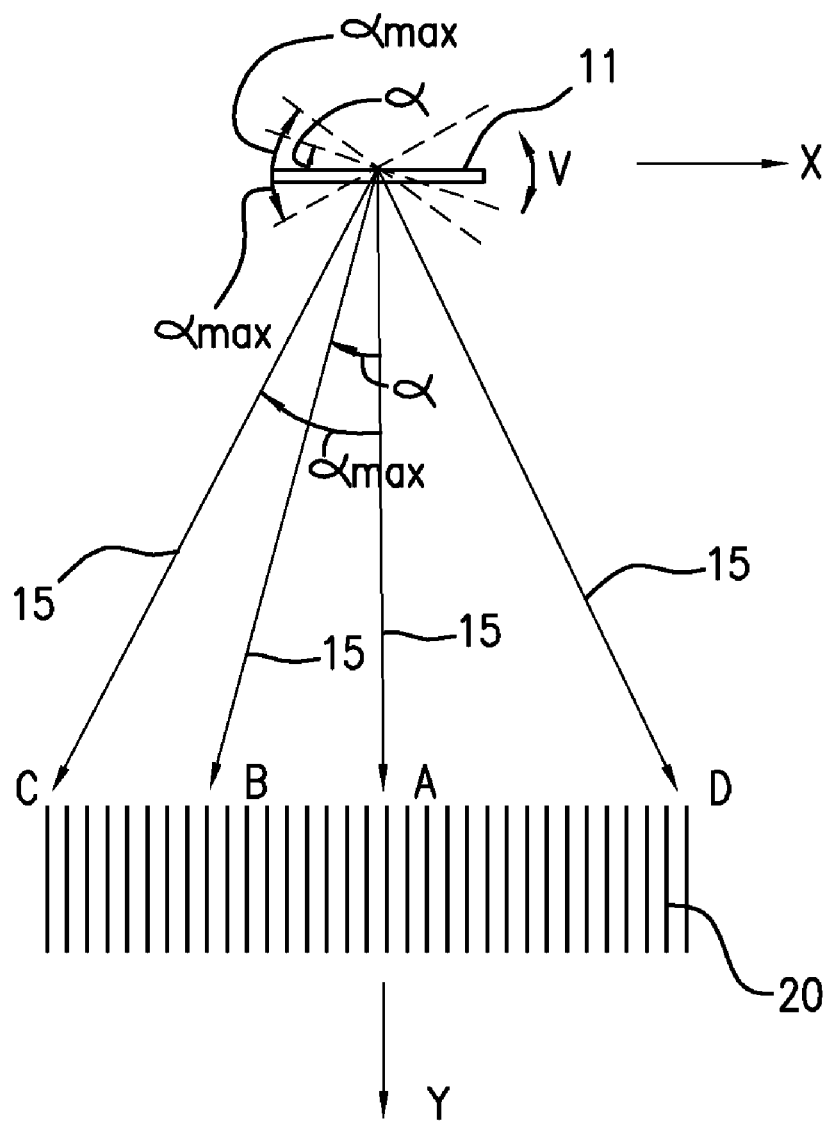
FIG. 1 illustrates how a mirror in a scanner oscillates to project a light beam across a barcode.
Figure 2:
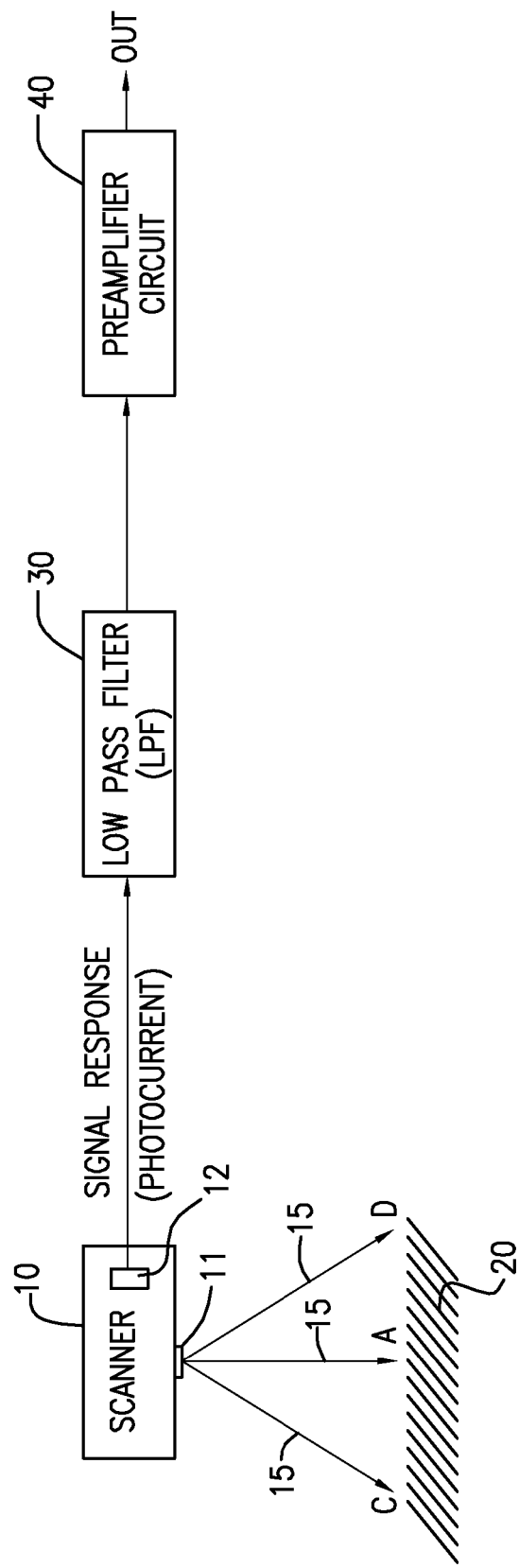
FIG. 2 illustrates the barcode scanning system in the prior art.
Figure 3:
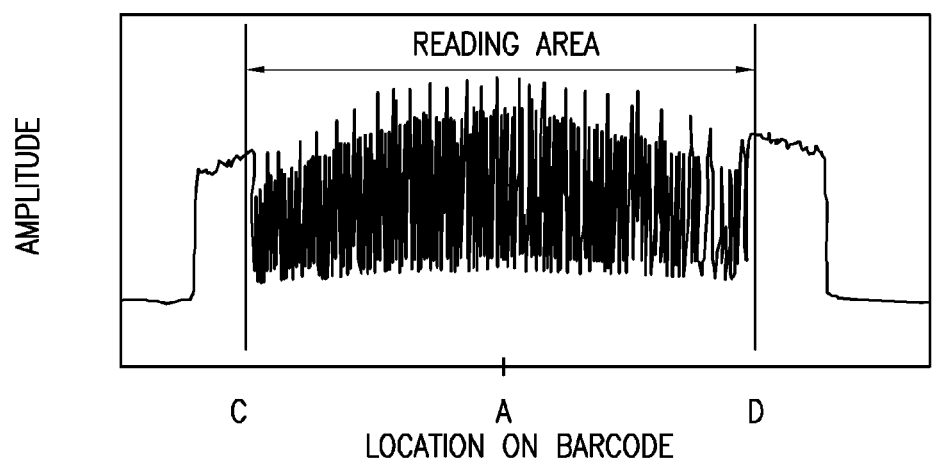
FIG. 3 illustrates the difference in amplitude of signal corresponding to different positions.
Figure 4:
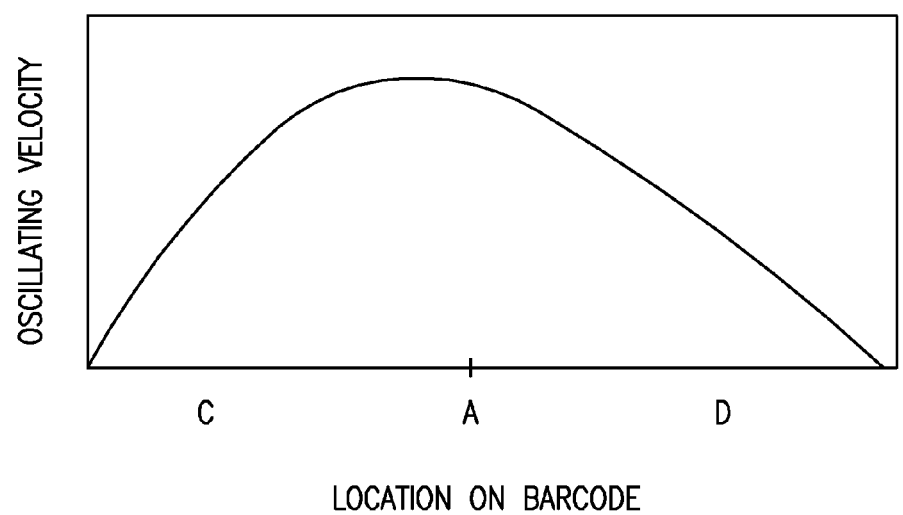
FIG. 4 illustrates the change in oscillating velocity of the mirror corresponding to different positions.
Figure 5:
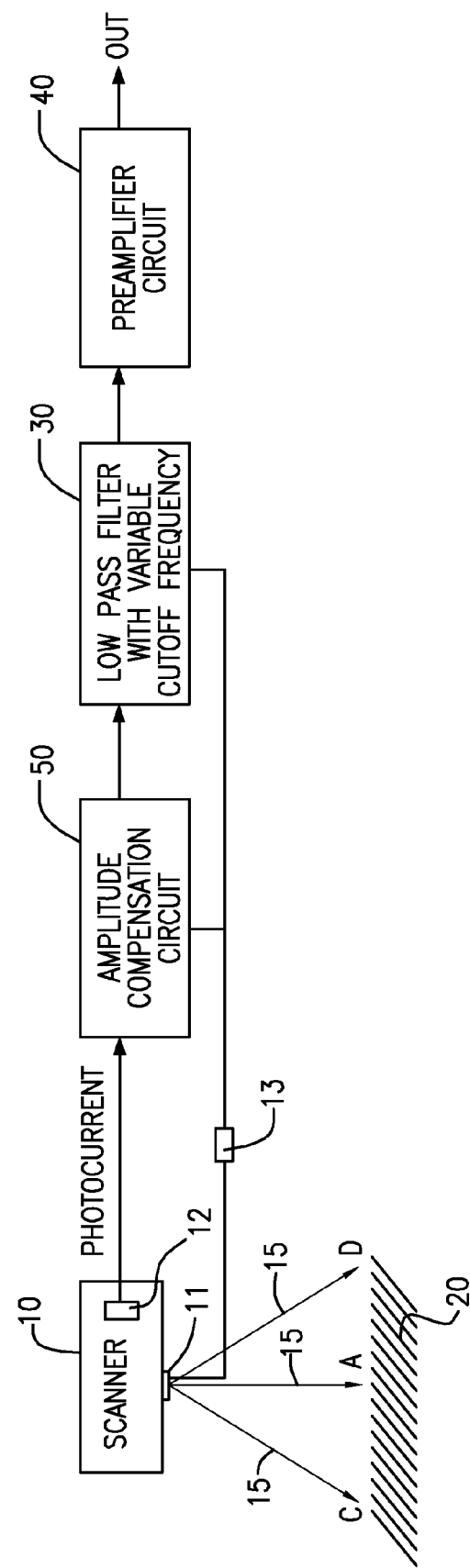
FIG. 5 illustrates an embodiment of the barcode scanning system according to the present invention.

A preferred embodiment of the barcode scanning system according to the present invention is illustrated in FIG. 5. Similar to the prior art as shown in FIGS. 1 and 2, to read the barcode 20, an oscillating mirror 11 in the scanner 10 projects the light beam 15 across the barcode 20 and a photocurrent is generated by a photodiode 12 as a signal response to light reflected from the barcode 20. As explained in the above, the amplitude of the signal changes when the mirror 11 oscillates to scan across the barcode 20 (see FIG. 3). More specifically, a signal corresponding to the center point A of the barcode 20 has the highest amplitude, while a signal corresponding to the edges C or D of the barcode 20 has the smallest amplitude.

In the exemplary embodiment described herein, the signal may be stored prior to processing as described herein. However, it is understood that this is by way of example and not limitation, and that the signal may also be processed in real time if desirable and assuming the hardware utilized to implement the techniques described herein is fast enough to perform the required processing. Programmable Logic Arrays (PLAs), digital signal processor chips, and other hardware containing sufficient processing power to perform these functions is readily available.

According to the present invention, an amplitude compensation circuit 50 is provided to preprocess the signal generated by the photodiode 12. More specifically, the signals corresponding to all the locations on the barcode 20 are compensated in amplitude to have the same amplitude as that of the signal corresponding to the center point A. Thus, after the compensation by the circuit 50, the photocurrent will have a consistent amplitude throughout all the locations on the barcode 20, which is equal to that of the photocurrent representing the center location A.

Since each location on the barcode 20 corresponds to an angular position a of the oscillating mirror 11, the locations on the barcode 20 can be represented by a corresponding angular position of the mirror 11 (represented by angle $\alpha$ in FIG. 1). Thus, according to the present invention, a sensor 13 is provided to determine the angular positions of the mirror 11, and the amount of compensation or gain in the amplitude of each signal is determined according to the corresponding angular position a of each signal. More specifically, the larger the angle $\alpha$, the more the compensation is applied.

As an alternative, since the angular position of the mirror 11 also corresponds to the moving velocity of the mirror 11, the locations on the barcode 20 can also be represented by the oscillating velocities of the mirror 11. Thus, instead of determining the angular position of the mirror, the sensor 13 determines the oscillating velocity of the mirror 11, which is used to determine the amount of compensation in amplitude for the corresponding signal.

Figure 6:
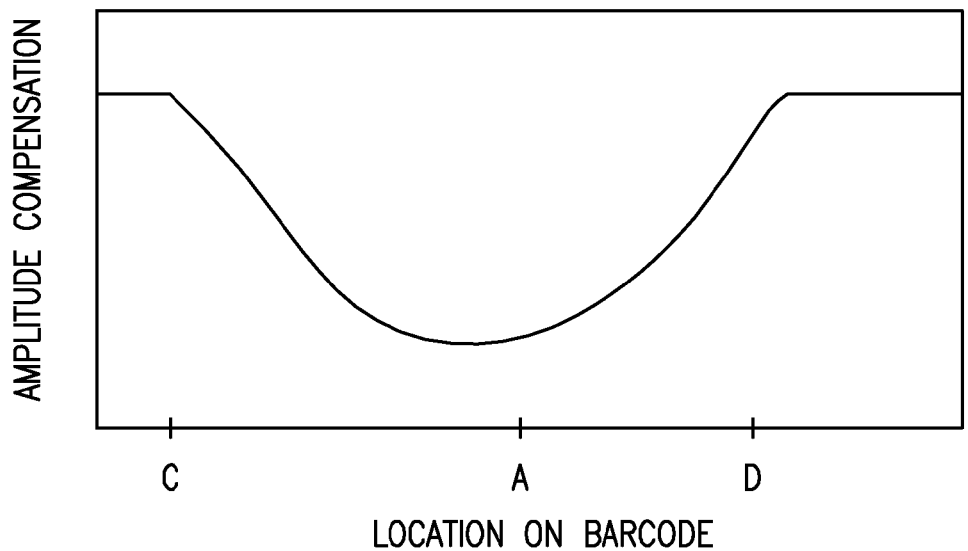
FIG. 6 illustrates the compensation in amplitude according to the present invention.
Figure 7:
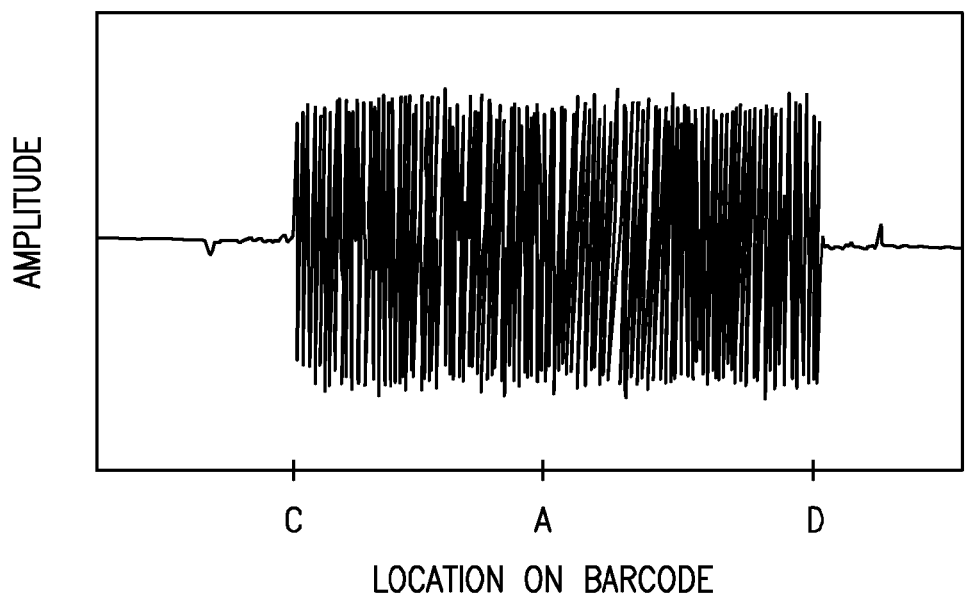
FIG. 7 illustrates the signal after the compensation in amplitude according to the present invention.

The amplitude compensation is shown in FIG. 6. The compensation for signals corresponding to larger angles $\alpha$ or smaller velocity V of the mirror (which corresponds to the edge locations C, D on the barcode 20) is large, while the compensation for signals closer to the zero $\alpha$ or maximum velocity of the mirror 11 (which corresponds to the center location A of the barcode 20) is small. The result of the preprocessing by the amplitude compensation circuit 50 is shown in FIG. 7, from which it can be seen that the amplitude of the signal is substantially the same for all the locations on the barcode 20.

Returning to FIG. 5, according to a further teaching of the present invention, the cutoff frequency of the low pass filter 30 is variable for different frequencies of the signals. More specifically, the cutoff frequency is increased for the signals of higher frequencies and is decreased for signals of lower frequencies. Thus, the cutoff frequency is always optimum for each signal.

Because the frequency of each signal corresponds to the oscillating velocity of the mirror 11, the cutoff frequency can be changed according to the oscillating velocity of the mirror 11 associate with each signal. To this end, the oscillating velocity can be determined by the sensor 13 and is provided to the low pass filter 30 to change the cutoff frequency accordingly.

As explained above, the oscillating velocity of the mirror corresponds to the angular position of the mirror 11. Thus, the changing of the cutoff frequency of each signal can be determined by the angular position (angle $\alpha$) of the mirror 11 corresponding to each signal. For this purpose, the sensor 13 may determine the angular position of the mirror 11 instead of its oscillating velocity.

Figure 8:
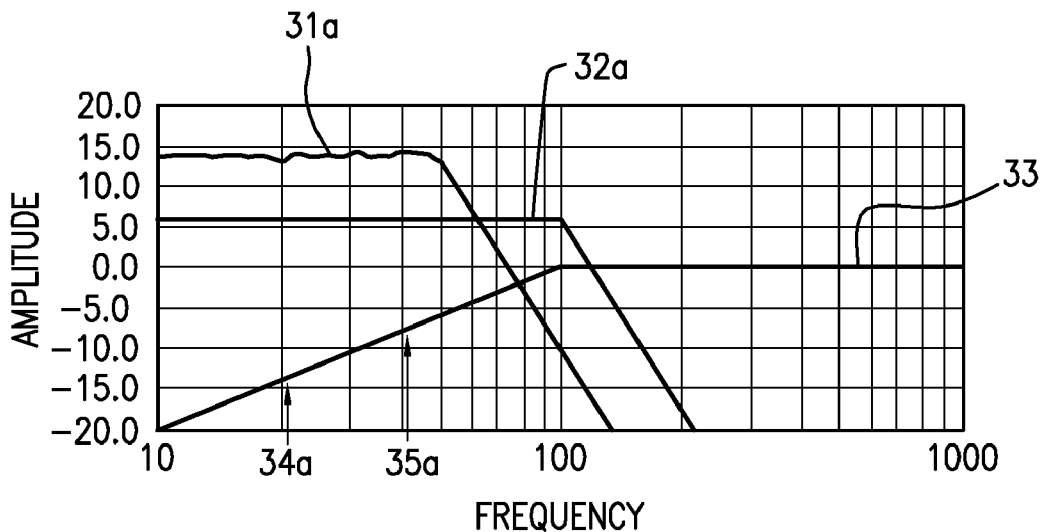
FIG. 8 illustrates a difference in cutoff frequency according to the present invention.

Preferably, the amplitude compensation circuit 50 may be incorporated into the low pass filter 30 as a variable weighting in amplitude, as illustrated in FIG. 8. An original signal response is illustrated as line 33. In particular, an original signal obtained at the edge points C or D of the barcode 20 is represented by 34a, which, as explained above, has a smaller frequency because of the slower oscillating velocity of the mirror 11 and has a smaller amplitude because of the larger distance between the mirror 11 and the edge points C and D. To the contrary, an original signal obtained at the center point A, as indicated by 35a, has a larger frequency and larger amplitude.

Figure 9:
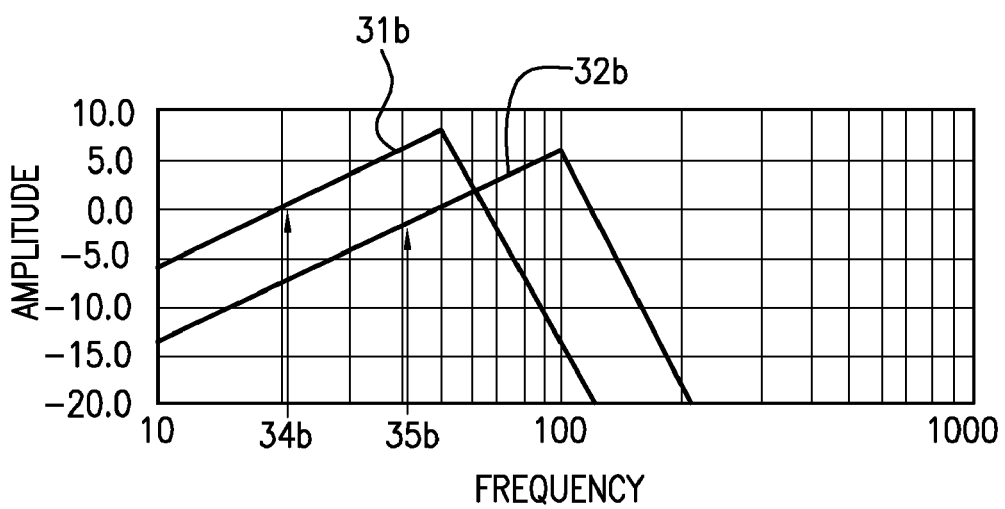
FIG. 9 illustrates the signal after being preprocessed according to the present invention.

The weighting of the low pass filter 30 for the edge signal 34a is illustrated as 31a, which, according to the teaching of the present invention, has larger amplitude compensation and a lower cutoff frequency. To the contrary, the weighting of the low pass filter 30 for the center signal 35a has smaller amplitude compensation and a higher cutoff frequency, as illustrated by 32a. After applying the respective weightings, the result is illustrated in FIG. 9, in which the amplitudes of both the signals 34a and 35a are now substantially the same (indicated as 34b and 35b respectively).

Although the above has described in detail the preferred embodiments of the present invention, it shall be understood that numerous changes, adaptations and modifications are available those with ordinary skill in the art without departing the gist of the present invention. For example, the barcode scanning system of the present invention may comprise the amplitude compensation circuit only while keeping the cutoff frequency in the low pass filter fixed for all the signals. Alternatively, the cutoff frequency in the low pass filter is variable, but the amplitude compensation circuit is omitted. Therefore, the scope of the present invention is intended to be defined only in the following claims.

The invention claimed is:

1. A barcode scanning system, comprising: a mirror oscillating angularly for projecting a light beam across a barcode to obtain a reflected light from said barcode;
   a photodetector for generating a signal from said reflected light, said signal having an amplitude corresponding to each angular position of said mirror along a scan;
   a circuit for processing said signal to filter it using a low pass filter having a cutoff frequency, wherein said cutoff frequency increases as a function of scanning velocity, the scanning velocity increasing when scanning toward the center of the barcode.

2. The barcode scanning system of claim 1, wherein said circuit is adapted to increase said amplitude corresponding to each angular position of said mirror to an amplitude corresponding to a center position of said mirror.

3. The barcode scanning system of claim 2, wherein said each angular position is represented by an oscillating velocity of said mirror at said each angular position.

4. The barcode scanning system of claim 1, further comprising a low pass filter for rejecting high frequency noises, and an amplifier for amplifying a light signal returned from a barcode to be read, and wherein said amplifier has a gain that increases in a manner inversely proportional to said scanning velocity.

5. The barcode scanning system of claim 4, wherein said signal has a frequency corresponding to each oscillating velocity of plural oscillating velocities of said mirror, and said low pass filter has a cutoff frequency that is variable according to an oscillating velocity of said mirror to which said signal corresponds, the cutoff frequency being greater when locations closer to a center of the barcode is scanned.

6. The barcode scanning system of claim 4, wherein said cutoff frequency is higher for a signal corresponding to a higher oscillating velocity of said mirror.

7. The barcode scanning system of claim 1, wherein said circuit comprises a digital circuit with a digital to analogue converter for generating a compensation signal for changing said signal.

8. The barcode scanning system of claim 1, wherein said photodetector is a photodiode.

9. The barcode scanning system of claim 8, wherein said signal is a photocurrent.

10. The barcode scanning system of claim 1, further comprising a preamplifier circuit for amplifying said signal after said signal is processed to have said same amplitude.

11. In a barcode scanning system having an oscillating mirror for projecting a scanning light beam across a barcode so as to generate a signal responsive to reflected light from said barcode, a method for processing said signal comprising a step of changing an amplitude of said signal such that said signal has substantially a same amplitude corresponding to all oscillating positions of said mirror, and processing said signal through a filter having a frequency response over frequencies of interest that varies as a function of mirror position so that frequencies that would be filtered out a4 as noise in some parts of the system are detected and processed as desired signal in other parts of the system, a cutoff frequency associated with said processing increasing as portions of a barcode closest to a center of said barcode are read.

12. The method of claim 11 wherein said changing comprises increasing said amplitude of said signal corresponding to each oscillating position of said mirror to an amplitude of a signal corresponding to a center position of said mirror.

13. The method of claim 12, further comprising a step of determining each of said oscillating positions from an oscillating velocity of said mirror.

14. The method of claim 12, wherein said increasing is implemented by a compensation circuit comprising a digital to analogue converter for generating a compensation signal.

15. The method of claim 11, further comprising a step of filtering said signal by a low pass filter having a cutoff frequency.

16. The method of claim 14, further comprising a step of changing said cutoff frequency of said low pass filter according to an oscillating velocity of said mirror to which said signal corresponds.

* * * * *